US 9,884,718 B2

(12) United States Patent
Parnall

(10) Patent No.: US 9,884,718 B2
(45) Date of Patent: Feb. 6, 2018

(54) FOLDING, LIGHTWEIGHT, HYGIENIC, HEAVY-DUTY FOOD SHIPPING CONTAINER

(71) Applicant: John Parnall, Midlothian, VA (US)

(72) Inventor: John Parnall, Midlothian, VA (US)

(73) Assignee: Greenbox International, LLC, Midlothian, VA (US)

( * ) Notice: Subject to any disclaimer, the term of this patent is extended or adjusted under 35 U.S.C. 154(b) by 323 days.

(21) Appl. No.: 14/178,462

(22) Filed: Feb. 12, 2014

(65) Prior Publication Data

US 2014/0224795 A1   Aug. 14, 2014

Related U.S. Application Data

(60) Provisional application No. 61/850,289, filed on Feb. 13, 2013.

(51) Int. Cl.
*B65D 6/18* (2006.01)
*B65D 90/14* (2006.01)
(Continued)

(52) U.S. Cl.
CPC ............. *B65D 90/14* (2013.01); *B65D 19/18* (2013.01); *B65D 19/38* (2013.01); *A47B 87/0276* (2013.01); *A47F 5/10* (2013.01); *B65D 11/18* (2013.01); *B65D 11/1833* (2013.01); *B65D 19/385* (2013.01); *B65D 21/0233* (2013.01); *B65D 21/0237* (2013.01); *B65D 21/086* (2013.01); *B65D 88/52* (2013.01);
(Continued)

(58) Field of Classification Search
CPC ...... B65D 19/38; B65D 19/18; B65D 19/385; B65D 11/18; B65D 11/1833; B65D 21/0233; B65D 21/0237; B65D 21/086; B65D 88/52; B65D 88/522; B65D 90/14; B65D 90/041; A47B 87/0276; A47B 87/0284; A47B 87/0292; A47B 87/02; A47B 87/00; A47B 87/007; A47F 5/10; F16B 12/02; F16B 12/10
USPC .... 220/6, 7, 4.28, 4.29, 4.31, 501, 503, 505, 220/527, 529, 531, 23.83, 23.86, 826, 220/817; 206/514; 211/188, 194, 195
See application file for complete search history.

(56) References Cited

U.S. PATENT DOCUMENTS 2,660,271 A  *  11/1953  Hupp ...................... B60D 1/00
                                                 403/182
4,591,065 A  *  5/1986  Foy ................................. 220/7
(Continued)

FOREIGN PATENT DOCUMENTS

DE   921794    * 12/1954
NL   9500208   * 10/1995 ............. B65D 19/12

OTHER PUBLICATIONS

English Translation for DE 921794.*

*Primary Examiner* — Fenn C Mathew
*Assistant Examiner* — Elizabeth Volz
(74) *Attorney, Agent, or Firm* — John H. Thomas, P.C.

(57) ABSTRACT

A reusable, sanitary and folding container includes a base, two folding sidewalls, two folding end walls and latches and hinges. The base includes slots that receive the hinge pins that allow the sidewalls and end walls to fold up and down. These hinge slots are open and provide for water or spray through them during the cleaning process of a container after it has been used. The container is formed of a resilient, but light polyurethane/fiber composite material.

15 Claims, 13 Drawing Sheets

(51) Int. Cl.
*B65D 19/18* (2006.01)
*A47F 5/10* (2006.01)
*B65D 19/38* (2006.01)
*F16B 12/10* (2006.01)
*B65D 21/08* (2006.01)
*B65D 88/52* (2006.01)
*B65D 21/02* (2006.01)
*F16B 12/02* (2006.01)
*B65D 6/16* (2006.01)
*B65D 90/04* (2006.01)
*A47B 87/02* (2006.01)

(52) U.S. Cl.
CPC .......... *B65D 88/522* (2013.01); *B65D 90/041* (2013.01); *B65D 2519/009* (2013.01); *B65D 2519/00034* (2013.01); *B65D 2519/00069* (2013.01); *B65D 2519/0086* (2013.01); *B65D 2519/00174* (2013.01); *B65D 2519/00273* (2013.01); *B65D 2519/00288* (2013.01); *B65D 2519/00323* (2013.01); *B65D 2519/00338* (2013.01); *B65D 2519/00497* (2013.01); *B65D 2519/00572* (2013.01); *B65D 2519/00587* (2013.01); *B65D 2519/00651* (2013.01); *F16B 12/02* (2013.01); *F16B 12/10* (2013.01); *Y02W 30/807* (2015.05)

(56) References Cited

U.S. PATENT DOCUMENTS

| | | | | |
|---|---|---|---|---|
| 4,674,647 | A | * | 6/1987 | Gyenge et al. .................. 220/6 |
| 5,632,392 | A | * | 5/1997 | Oh .................................. 220/7 |
| 5,868,269 | A | * | 2/1999 | Juarez ............... B65D 25/2826 220/529 |
| 6,415,938 | B1 | * | 7/2002 | Karpisek ...................... 220/1.5 |
| 6,726,046 | B2 | * | 4/2004 | Orset .............................. 220/7 |
| 7,093,731 | B2 | * | 8/2006 | Karpisek ...................... 220/1.5 |
| 2003/0075541 | A1 | * | 4/2003 | Bartasevich, Jr. . B65D 11/1833 220/6 |
| 2004/0089657 | A1 | * | 5/2004 | Waszak ...................... 220/4.03 |
| 2004/0222222 | A1 | * | 11/2004 | Parnall et al. ................... 220/6 |
| 2006/0113302 | A1 | * | 6/2006 | Mandava ............ B65D 88/129 220/1.5 |
| 2008/0169285 | A1 | * | 7/2008 | Marazita ............... B65D 19/18 220/7 |
| 2010/0147727 | A1 | * | 6/2010 | Valdimarsson ........ B65D 19/04 206/509 |
| 2012/0061386 | A1 | * | 3/2012 | Parsons ............... H05B 6/6408 219/734 |

* cited by examiner

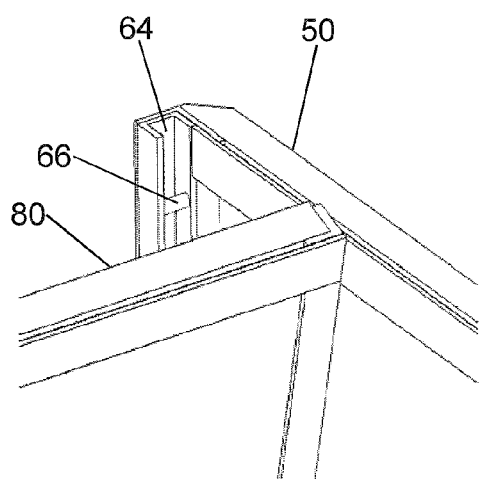
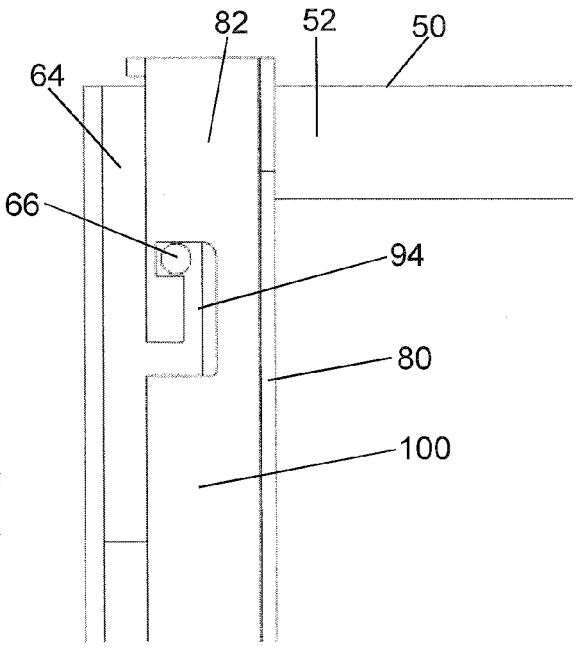
Figure 13D
Figure 13C
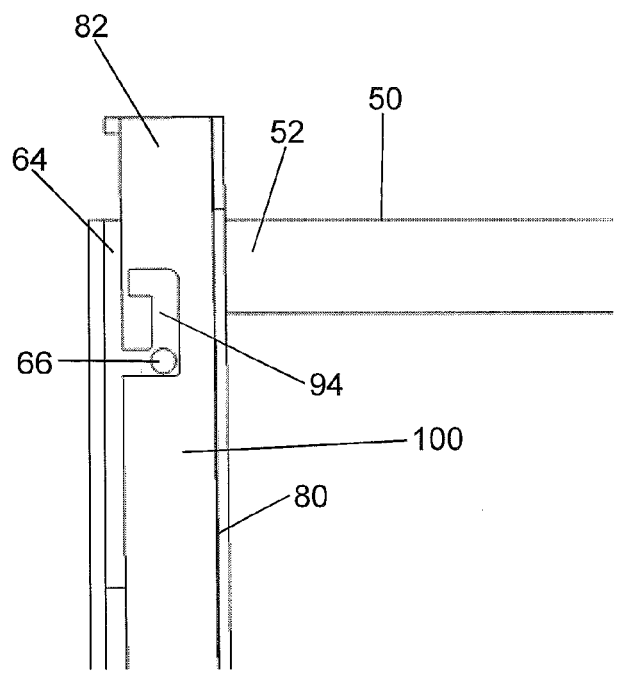
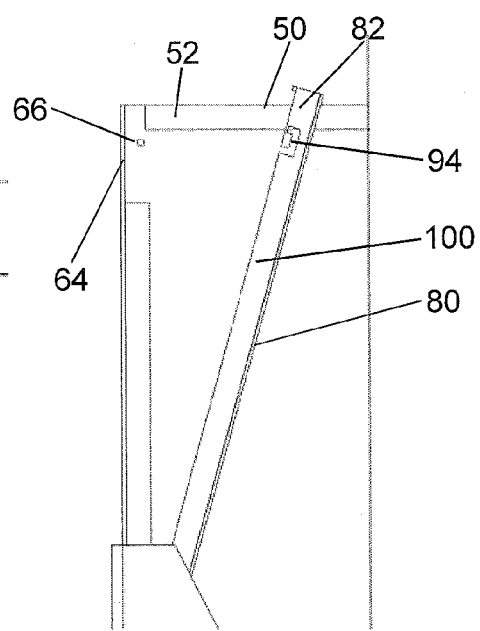
Figure 13B
Figure 13A the sidewalls. The C-shaped channel includes a latch pin fixed across the channel and proximate a top side of the sidewalls and the end of the C-shaped channel opposite the bottom side of the sidewalls.

FOLDING, LIGHTWEIGHT, HYGIENIC, HEAVY-DUTY FOOD SHIPPING CONTAINER

This application claims the benefit of U.S. Provisional Patent Application No. 61/850,289, filed on Feb. 13, 2013, which is incorporated by reference herein in its entirety.

The field of the present invention is lightweight, heavy-duty, bulk shipping containers. These containers are widely used in the movement of food products. Specifically, the present invention is directed to a folding, reusable container that can be reliably cleaned for reuse.

BACKGROUND

At present, the food industry uses large shipping containers to move a broad range of food products across the country and around the world. These containers are large enough to hold hundreds and even thousands of pounds. The most common type of food shipping container is a single-use corrugated paper container that is moved around on a heavy wooden pallet. These containers and pallets are relatively heavy, and they are expensive and inefficient in that they may only be used a single time before disposal is required. The corrugated paper structure of these containers is not heavy-duty enough for reuse. Furthermore, the corrugated material cannot be reused for hygienic reasons because the container cannot be thoroughly washed and cleaned for reuse. Furthermore, they put a greater burden on landfills because contaminated corrugated boxes are very difficult to recycle (no one wants them because they have bacteria, E. coli, salmonella, campylobacter, etc. and they smell bad). The amount of contaminated corrugated boxes could be as high as 20% of the total volume used.

Reusable, plastic containers are known for use. However, existing containers may be too heavy for commercially economical reuse. Also, existing plastic containers have nooks and crevices and other engineering details that make them very difficult, if not virtually impossible, to reliably clean and inspect for cleanliness. Additionally, most existing plastic boxes are made of inexpensive polypropylene or polyethylene and therefore periodically plastic parts break off during use and contaminate the food product.

SUMMARY

Accordingly, it is an object of the present to provide a folding, lightweight, hygienic and heavy-duty shipping container. The container is engineered to be able to be reliably cleaned for reuse in the industry.

In one example, a reusable, sanitary and folding container includes a base, two folding sidewalls, two folding end walls and latches and hinges. The base includes a rectangular platform having four corner portions fixed at each of the four corners of the base platform respectively. Each corner portion has a raised, two-wall, V-shape that defines the corner of the platform. Further, each of the corner walls of the V-shaped corner portion comprises a vertical slot that is an open slot through the thickness of the corner wall.

The two folding sidewalls are rectangular surfaces, each sidewall comprising two hinge pins that extend outwardly from two corners along a bottom side of each rectangular sidewall. The hinge pins are received in two of the vertical slots of the adjacent corner portions so that the bottom sides of the sidewalls are hingedly connected to the base. The sidewalls are mounted on opposite sides of the base. Each sidewall comprises a C-shaped channel attached to opposite side edges that are each perpendicular to the bottom sides of the sidewalls. The C-shaped channel includes a latch pin fixed across the channel and proximate a top side of the sidewalls and the end of the C-shaped channel opposite the bottom side of the sidewalls.

The two folding end walls are rectangular surfaces, each end wall comprising two hinge pins that extend outwardly from two corners along a bottom side of each rectangular end wall. The hinge pins are received in two of the vertical slots of adjacent corner portions so that the bottom sides of the end walls are hingedly connected to the base. The end walls are mounted on opposite sides of the base. Each end wall comprises a latch that extends outwardly from the end wall on opposite side edges perpendicular to the bottom sides of the end walls. The latch comprises a slot for engaging the latch pin of an adjacent sidewall when the sidewall and end wall are rotated in the up position substantially normal to the plane of the bottom of the box.

The latch on each side of each end wall may comprise a flange having a latch groove therein adapted to receive and engage the latch pin of the adjacent sidewall. Alternatively, the latch on each side of each end wall comprises an L-shaped finger adapted to hook over and engage the latch pin of the adjacent sidewall.

The base, two folding sidewalls and two folding end walls may be comprised of plastic, in one example a polyurethane and fiberglass composite.

The container may also include a plurality of feet attached thereto on the opposite side of the platform from the corner portions, wherein the feet are substantially monolithic and include essentially no exposed crevices therein. The feet may be comprised of polyurethane.

The container may further comprise a damage reduction insert that includes a rectangular box sized to fit inside the container. The box comprises a base, two sidewalls and two end walls. The box sidewalls and end walls have a height that is less than the height of the container sidewalls and end walls. The box further comprises a box flange on the top side of the box sidewalls and end walls and opposite the box base. The box flange is adapted to engage the top of the container sidewalls and end walls so that the box base is secured inside the container and above the container base. The box base may comprise a door that is retained on the box base edge but that is hingedly connected to the box base edge so that the flap rotates upwardly when the box base is inverted to an upside down position.

The base, sidewalls and end walls may be each monolithic and contain no hollow portions therein. Further, the base, sidewalls and end walls may be coated with a polymer. The base, end walls and sidewalls comprise no crevices. The topography of the base, sidewalls and end walls may comprise no texture more than about one half of the thickness of the respective base, sidewall or end wall having an uneven surface.

In another example, the flange with a latch groove of the sidewalls of the container may each comprise an aperture in the channel that is perpendicular to the sidewall and proximate a top side of the sidewalls and end of the flange with a latch groove channel opposite the bottom side of the sidewalls. The end walls may comprise a latch that extends outwardly from the end wall on opposite side edges perpendicular to the bottom sides of the end walls, the latch is adapted to engage the aperture in the channel of an adjacent sidewall when the sidewall and end wall are rotated in the up position substantially normal to the plane of the bottom of the box. In another example, the latch may comprise a clip that frictionally engages the sidewall aperture.

BRIEF DESCRIPTION OF THE DRAWINGS

FIGS. 13A-13D illustrate the latching mechanism of an alternative latch construction to that shown in FIGS. 6 and 7A-7C.

DETAILED DESCRIPTION

Figure 1:
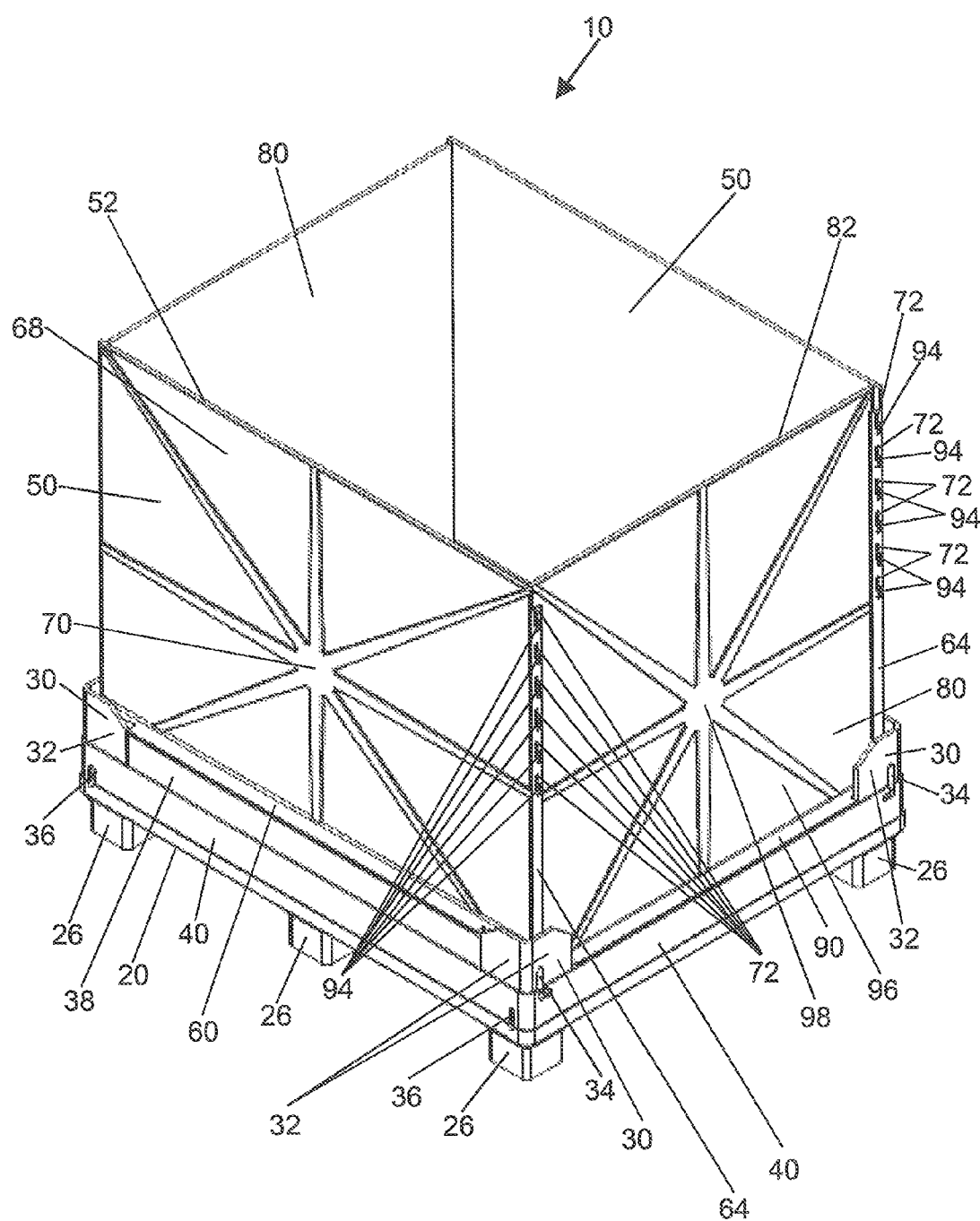
FIG. 1 is a perspective view of a shipping container as described herein.
Figure 2:
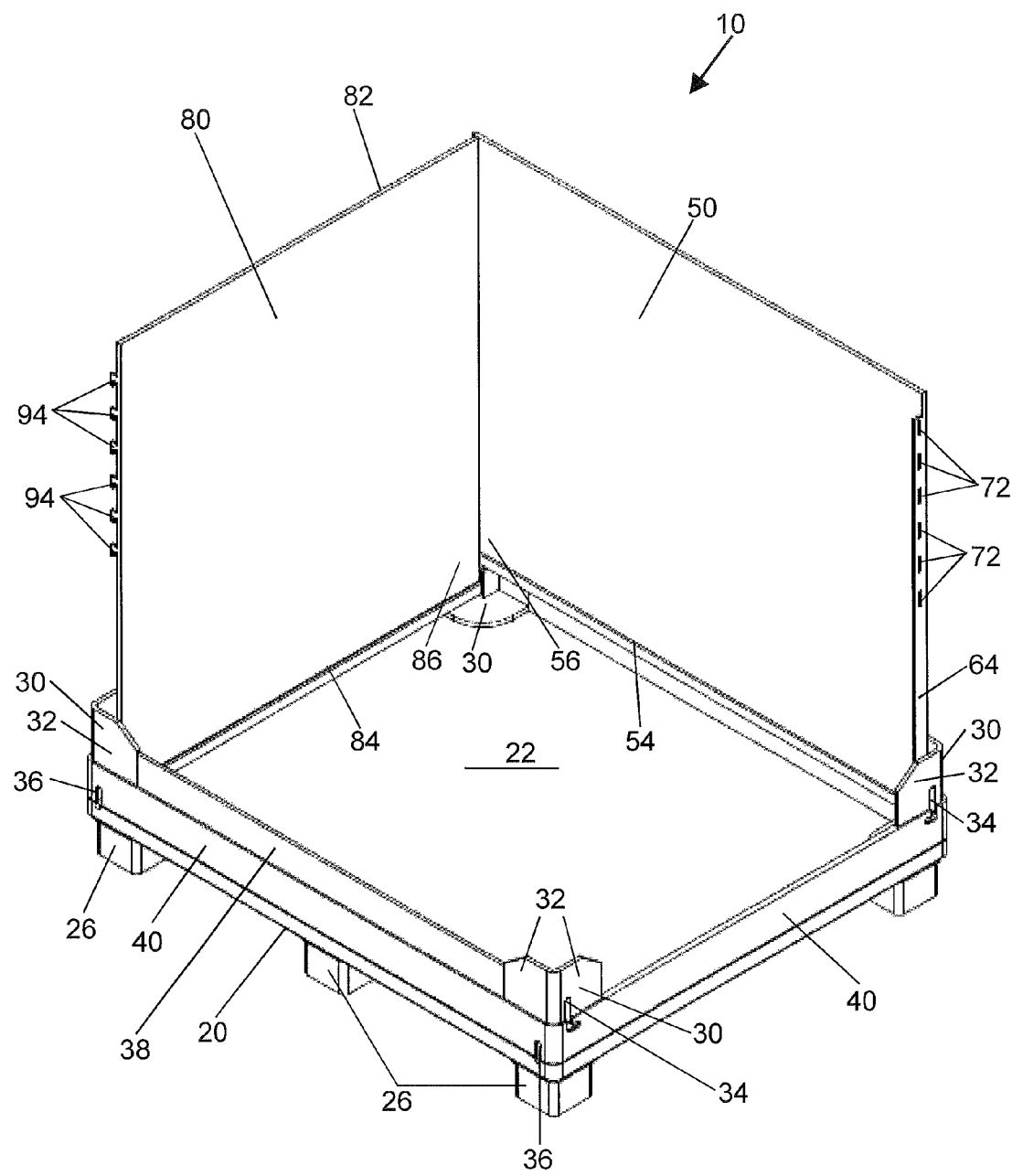
FIG. 2 is a perspective view of a shipping container as described herein with a sidewall and an end wall removed.

The container described herein is a rectangular box that may be used for transporting a wide variety of meats, produce and other goods. The container may be virtually any size depending on an industry need. The teachings apply to both larger and smaller scale versions of a box than described herein. An exemplary container is a container that is 48 inches wide by 40 inches long by 48 inches tall. An industry that uses these containers includes the protein industry shipping poultry and pork products, among others.

With reference now to the Figures, the container 10 is made up of a base 20, sidewalls 50, and end walls 80. Each of these components shall be addressed in more detail. It should be noted that the components named sidewalls 50 and end walls 80 are given these arbitrary names. It is only important that the sidewalls 50 and end walls 80 are opposite walls. They could be referred to in vice versa terminology in the drawings. Still further alternatively, a container may have a square base such that the sidewalls and end walls would be the same size.

Figure 3:
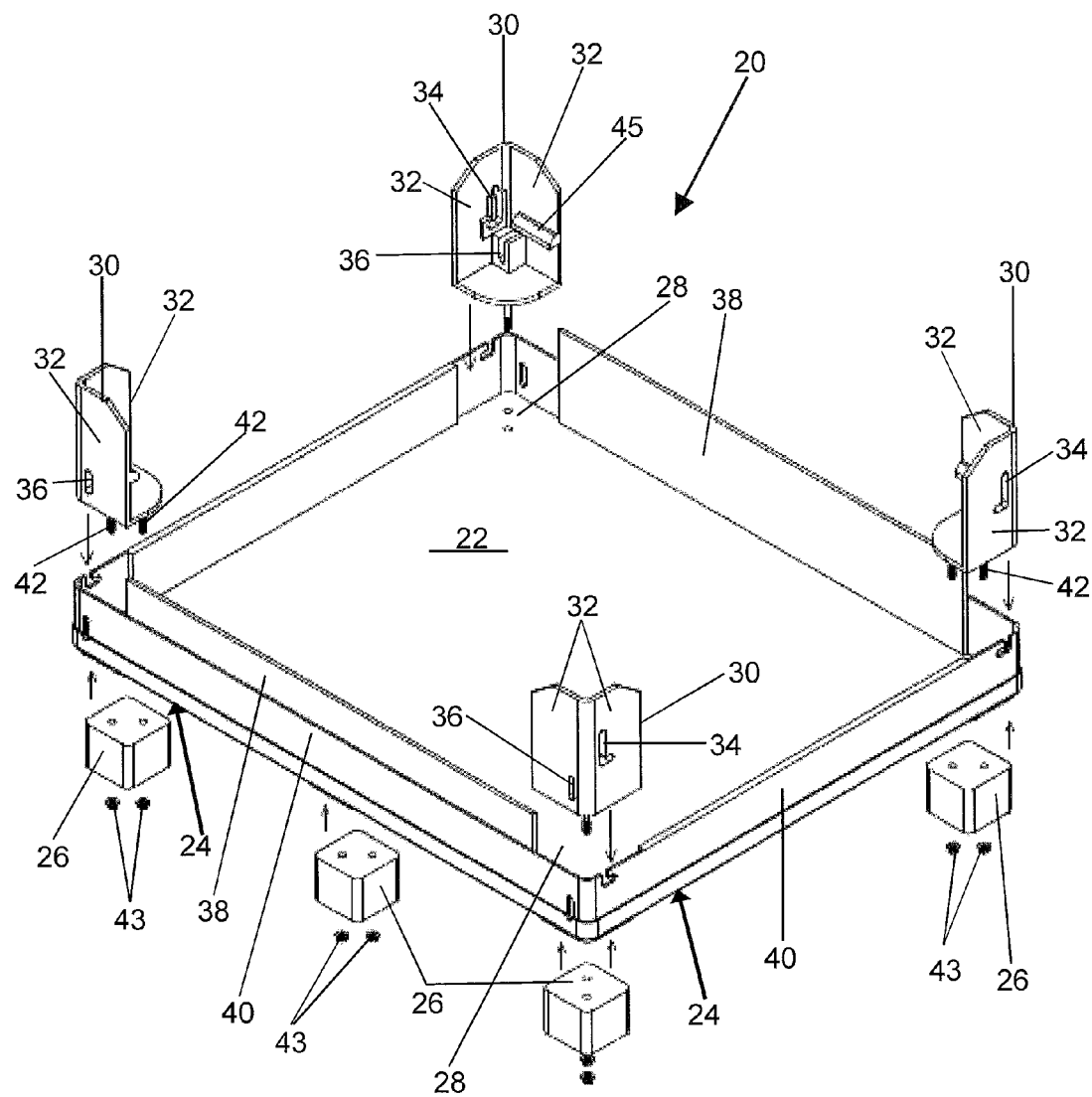
FIG. 3 is an exploded, perspective view of the base of a container as described herein.
Figure 4:
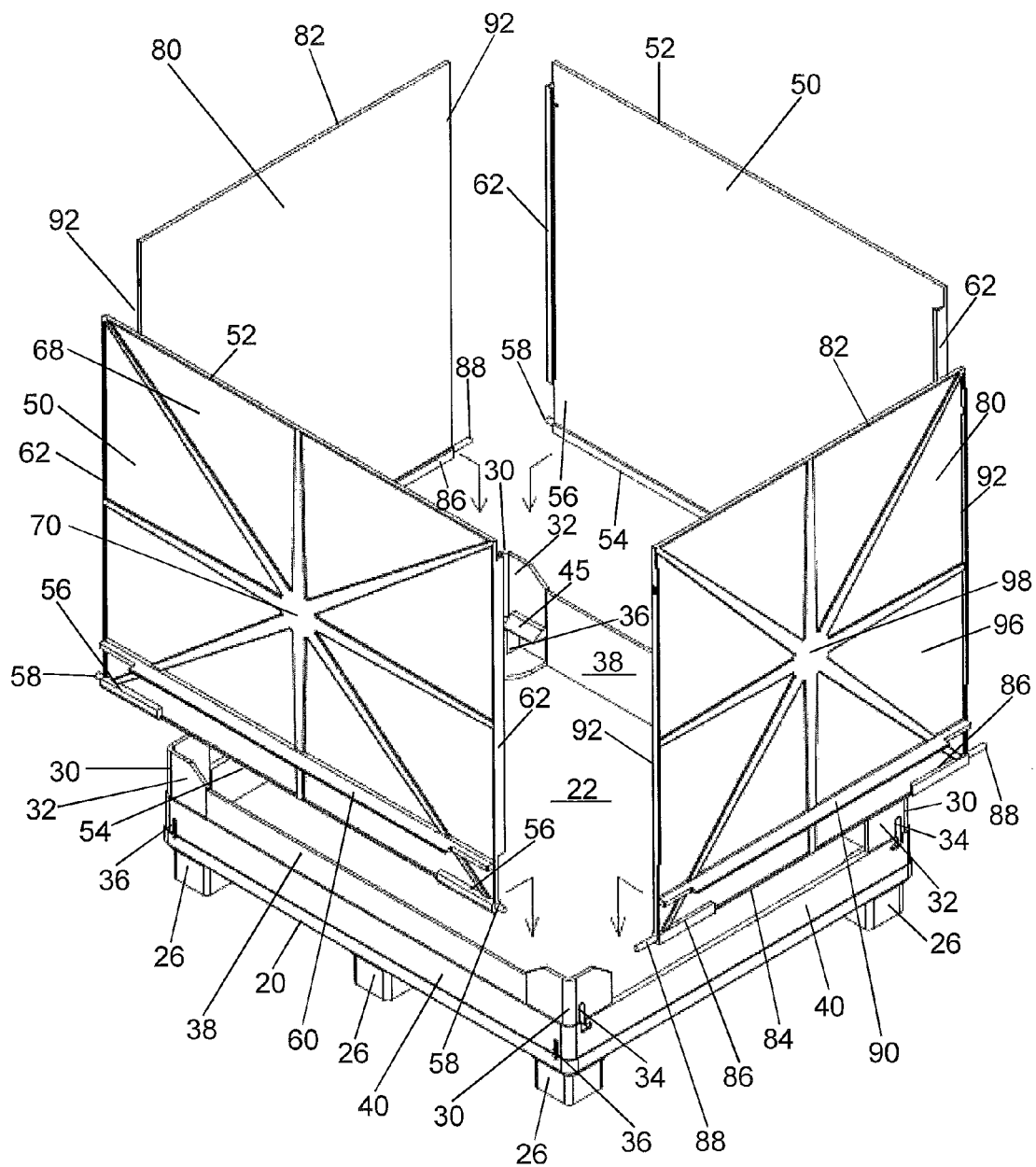
FIG. 4 is a perspective view of a container where the sidewalls and end walls are shown in exploded view.

The base 20 includes a top surface platform 22 and a bottom surface 24 on the opposite side of the planar surface platform. Attached to the bottom surface 24 of the base 20 are feet 26. As shown, the feet 26 are attached to the corners 28 of the base 20. There may be additional feet 26 attached at a midpoint of the sides of the base 20 and at structurally important locations on the bottom surface 24 of the base 20. For instance, a container that is intended for very heavy weights and rough use may have more feet than a container that is intended for use to transport lightweight products. The feet 26 may be integral with the base 20 in that they are all molded as a single piece together with the base 20. Alternatively, the feet 26 are separately molded and attached to the corners 28 of the base 20. Specifically with reference to FIG. 3, the feet 26 are bolted onto the bottom surface 24 of the base 20 using bolts 42 and nuts 43. Importantly, it is preferred that the material that is used to form the feet 26 is rugged but also pliant enough that when tightened against the bottom surface 24 of the base 20, the feet 26 will compress and seal thereto and not form any crevices between the feet 26 and the bottom surface 24.

The top surface platform 22 has corner portions 30 situated at each of the corners 28 of the rectangular surface platform 22. The corner portions 30 include corner walls 32 having a V-shape and standing up perpendicular to the plane of the top surface platform 22. Each of the corner walls 32 of the corner portions 30 has slots 34 and 36 therein that each extend through the entire thickness of each of the corner walls. The corner portions slots 34 and 36 have a vertical length that allows a hinge pin to slide up and down in that slot. Functionally, the length of the corner portions slots 34 and 36 enables the movement of the hinge pins up and down during the latching process and also during the fold-up storage process of the container 10. Accordingly, the slot length must be at least greater than the thickness of the respective sidewalk and end walls having hinge pins mounted within the corner portions slots 34 and 36. Similarly, the with of the corner portions slots 34 and 36 is greater than the diameter of the hinge pins that will rotate and slide therein. Additionally, the slot width is large enough to enable washing water and spray to pass freely through the open slots.

The base 20 also includes retaining flanges 38 along one or more of the four walls of the base 20. In the Figures, there are two retaining flanges 38 that will support the sidewalls 50. The retaining flanges 38 are perpendicular to the top surface platform 22. The retaining flanges 38 may preferably be integral or formed with the base 20. Alternatively, the retaining flanges 38 may be attached to the base 20. These retaining flanges 38 are optional only, if the product being shipped is lightweight, then they might not be necessary. In one example, the retaining flanges 38 are approximately two inches tall and extend along substantially the entire length of the sides of the base 20 in between the corner portions 30. The composition of the retaining flanges 38 is typically the same as the composition of the rest of the base 20. However, the composition could be different depending on the duty requirements of the container.

Rub rails 40 are formed integrally with the base 20 and are protective strips that mitigate or prevent damage to the container 10 during handling.

The base 20, and the top surface platform 22 of the base especially must be formed from a tough composition, because the base is a load bearing component of the container 10. The container 10 may bear loads of 500 to 3,000 pounds during service. An example composition of the base 20 is a polyurethane/fiber composite having dimensions of 48 inches by 40 inches and a thickness of $\frac{1}{16}$ to $\frac{1}{4}$ of an inch. The thickness of the base 20 may be more or less consistent with the motivation that the entire container 10 should be relatively lightweight for purposes of shipping product.

The sidewalls 50 have a top side 52, bottom side 54 and sides 62 that define a rectangular wall panel. The sidewalls 50 include bottom corners 56 from which protrude outwardly hinge pins 58. The hinge pins 58 are received in corner portion slots 34. The sidewalls 50 further include a deflector 60 that is a small ridge along the outside surface 68 of the sidewalls 50. The deflector 60 serves to prevent any inadvertent, unwanted foreign material from sliding down the wall and into the container in the gap at the bottom of the sidewall 50 when mounted on the base 20. The deflector 60 runs substantially the full length of the sidewalls 50.

A C-channel 64 is configured along the opposite sides 62 of the sidewalls 50 with the open C-portion facing inwardly. In FIGS. 13A-13D, the C-channel 64 is best shown with the C-shape. In FIGS. 6 and 7A-7C, the channel 64 has an L-shape, but functionally serves a similar latch receiving purpose. In either example, the channel 64 is an example of a flange that receives a latch. The C-channel 64 will receive and support the sides of neighboring end walls 80 when in the up position. The C-channel 64 extends along a portion of the length of the side 62 of the sidewalls 50. Alternatively, the C-channel 64 may extend along substantially the full length of the side 62 of the sidewalls 50. Still further alternatively, a C-channel 64 may have segments along the sides 62 of the sidewalls 50. The C-channel 64 may be molded into the sidewall 50. The C-channel 64 may be integral with the sidewall 50 and therefore seamless therein. Still further alternatively, the C-channel 64 can be fastened onto each side 62 of the sidewalls 50. Preferably, the sidewall 50 is a monolithic piece of molded plastic. There are no hollow sections of the sidewalls 50, preferably. The hinge pins 58 may be molded in with the sidewalls 50, or alternatively they may be part of the plastic mold. Similarly, the C-channel 64 may be molded in or, alternatively, a part of the plastic mold.

The sidewalls 50, and specifically the C-channel 64, further include a latch pin 66 across the C-channel 64 (FIGS. 13A-13D). Alternatively, the latch receiver may be one or more apertures 72 (FIGS. 6 and 7A-7C) through the bottom of the C-channel 64. Still further alternatively, the latch receiver may be multiple pins and/or multiple apertures along the length of the C-channel 64.

The topography of the outside surface 68 of the sidewalls 50 may include a molded pattern 70. Importantly, this molded pattern 70 must be a topography that includes no 90° corners in order to facilitate the cleaning and sanitizing of the sidewalls 50. Also, preferably, the topography of the outside surface 68 of the sidewalls 50 are shallow enough that they would not exceed 50%, or alternatively 25% of the depth or thickness of the sidewalls 50.

The end walls 80 are rectangular wall panels having a top side 82, bottom side 84, bottom corners 86 and hinge pins 88 that extend outwardly from the bottom corners of the end walls 80. The hinge pins 88 are received in the corner portion slots 36 of the base 20. Accordingly, the end walls 80 are allowed to rotate up and down on the hinges 88. The two end walls 80 are mounted opposite each other on the base 20 and between the two sidewalls 50. All of the end walls 80 and sidewalls 50 form the walls of the rectangular container 10 with the base 20.

The end walls 80 include a deflector 90 that, like the deflector 60 of the sidewalls, is intended to prevent foreign material from accidentally dropping down inside the container 10. The sides 92 of the end walls 80 include integral latch hooks 94. The latch hooks 94 may be a male hook protrusion 94 having an L-shape (e.g. FIGS. 7A-7C). Alternatively, the latch hooks 94 may be an integral groove within a flange 100 that is adapted to receive the latch pin 66 of the sidewall 50 (e.g. FIGS. 13A-13D). Multiple latch hooks 94 may correspond to multiple pins 66 or multiple apertures 72 in the flange 64 of the sidewalls 50. The latch hooks 94 are proximate the sides 92 and near the top side 82 of the end wall 80. The hooks or hook grooves may be spaced along the length of the sides 92 of the end walls 80.

Preferably, the end walls 80 are monolithic and solid so that there are no hollow portions therein. Preferably, the latch hooks 94 are integral with or may alternatively be molded integrally with the end walls 80 so that there are no crevices around them.

The outside surface 96 of the end walls 80 may include some topographical design or molded pattern 98. Preferably, this topography creates an unevenness that is no more than about 50%, or alternatively about 25% of the thickness of the end walls 80. Importantly, the molded pattern 98 does not include any 90° corners that could harbor bacteria or unwanted pathogens.

Figure 5A:
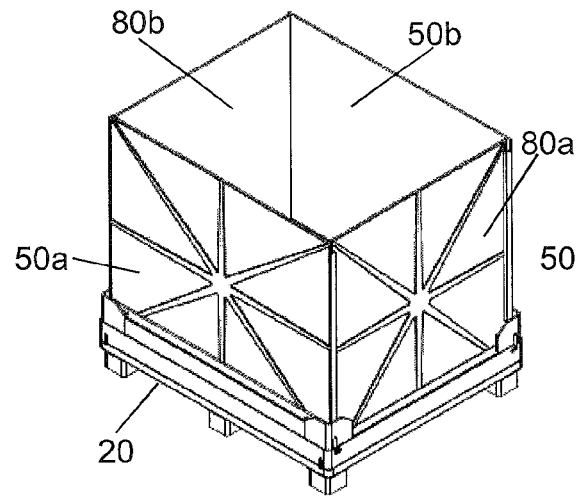
FIGS. 5A-5E are perspective views of a container as it is folded up or collapsed for storage and transport.
Figure 5B:
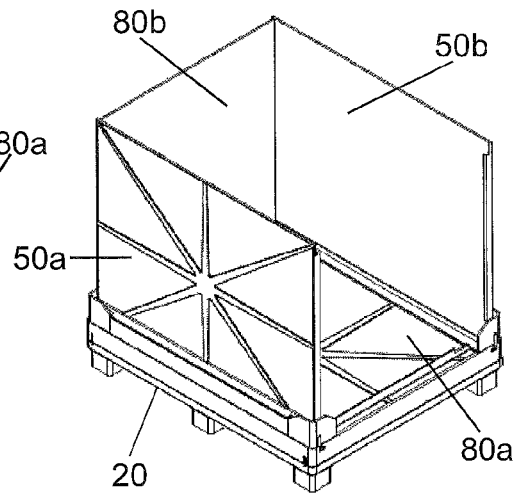
Figure 5C:
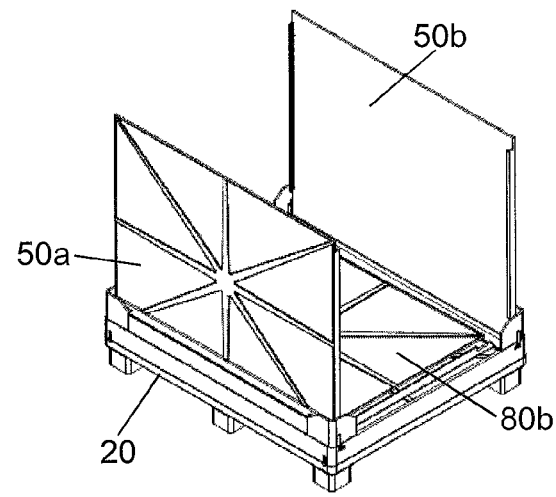
Figure 5D:
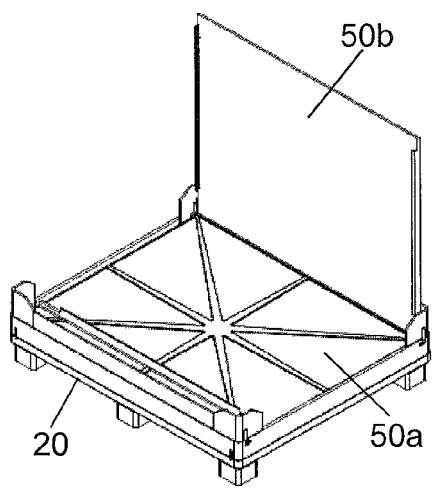
Figure 5E:
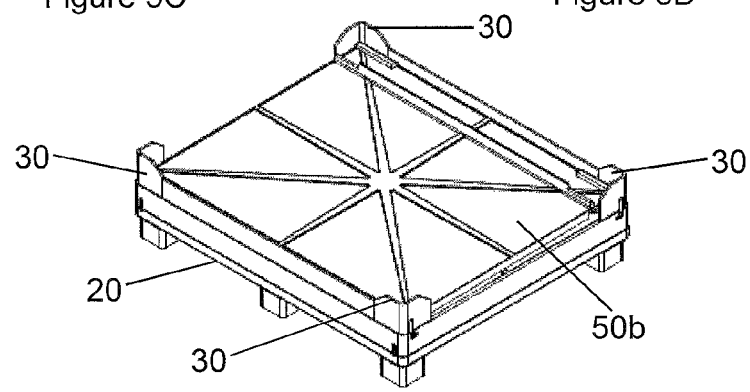
Figure 6:
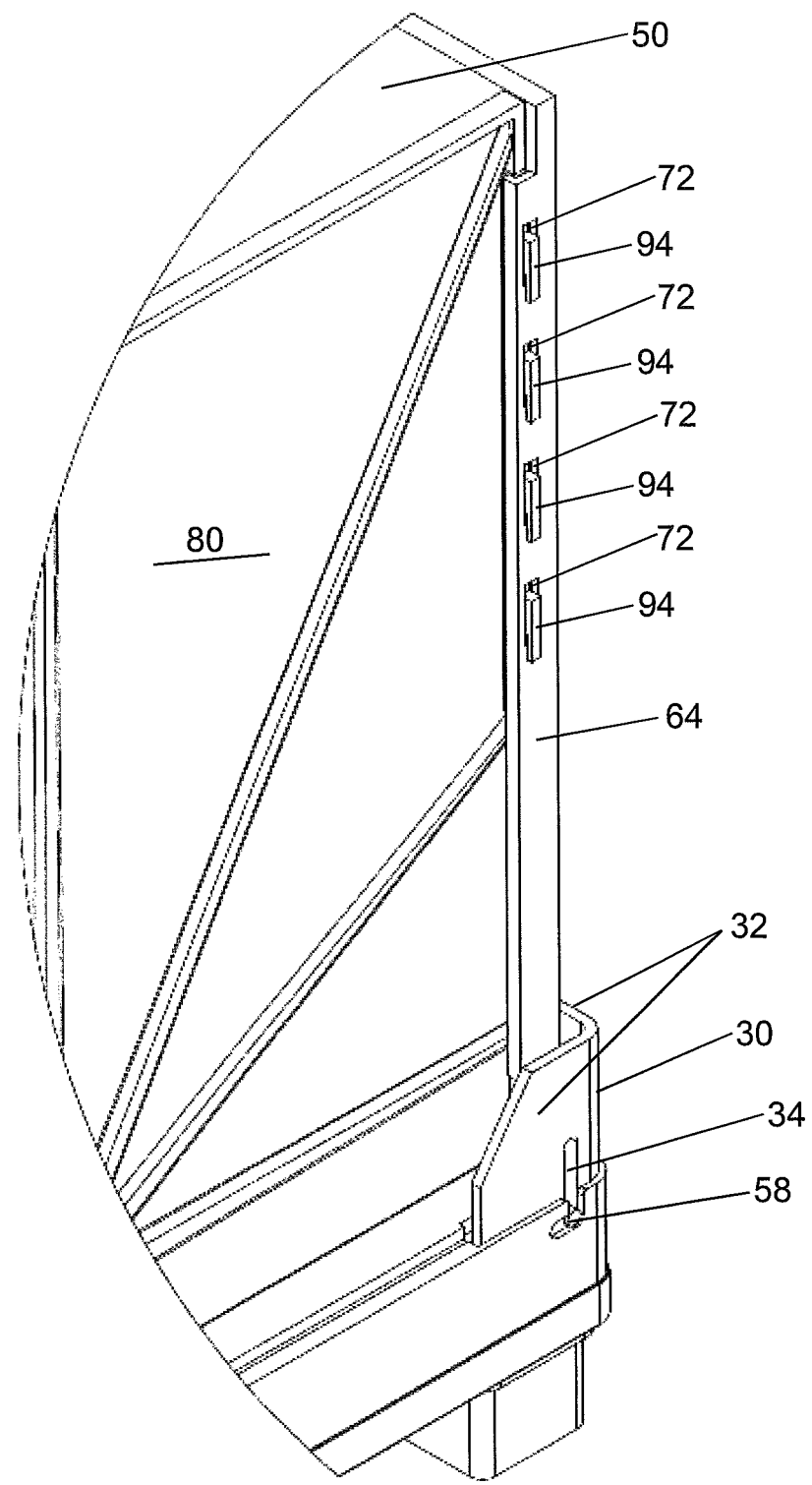
FIG. 6 is a cutaway view of a corner of a container as described herein.
Figure 7C:
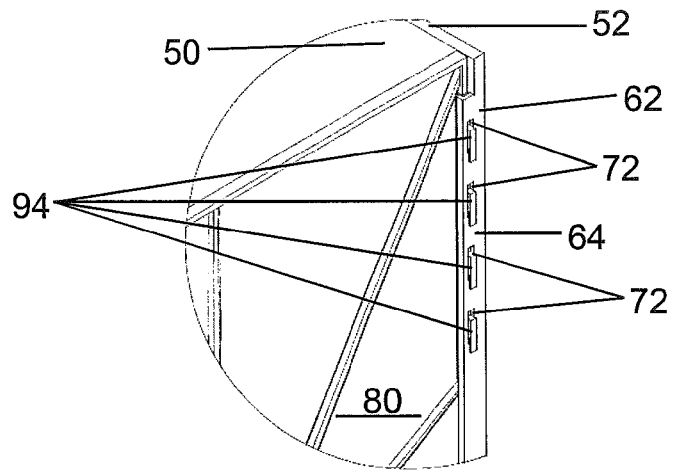
FIGS. 7A-7C demonstrate the latching mechanism of a container as described herein.
Figure 7B:
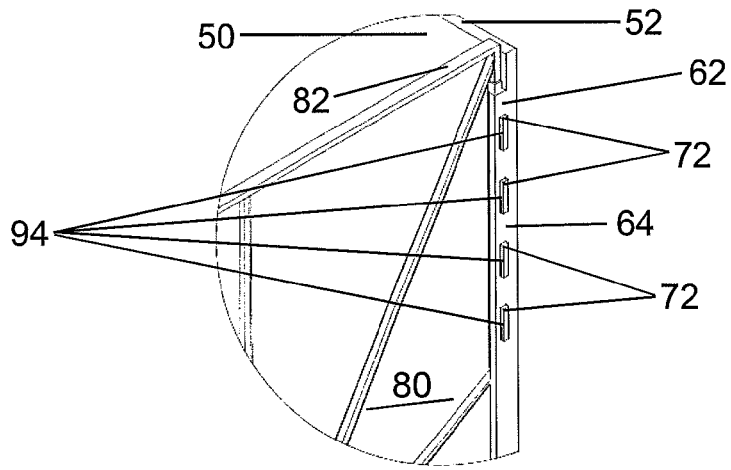
Figure 7A:
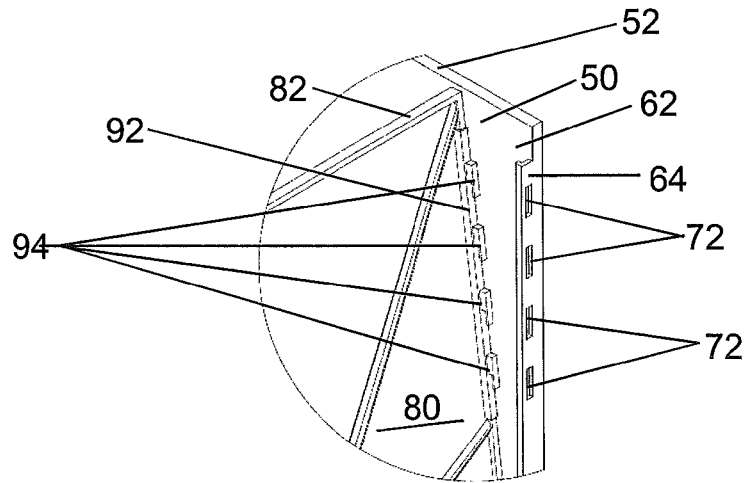
Figure 8:
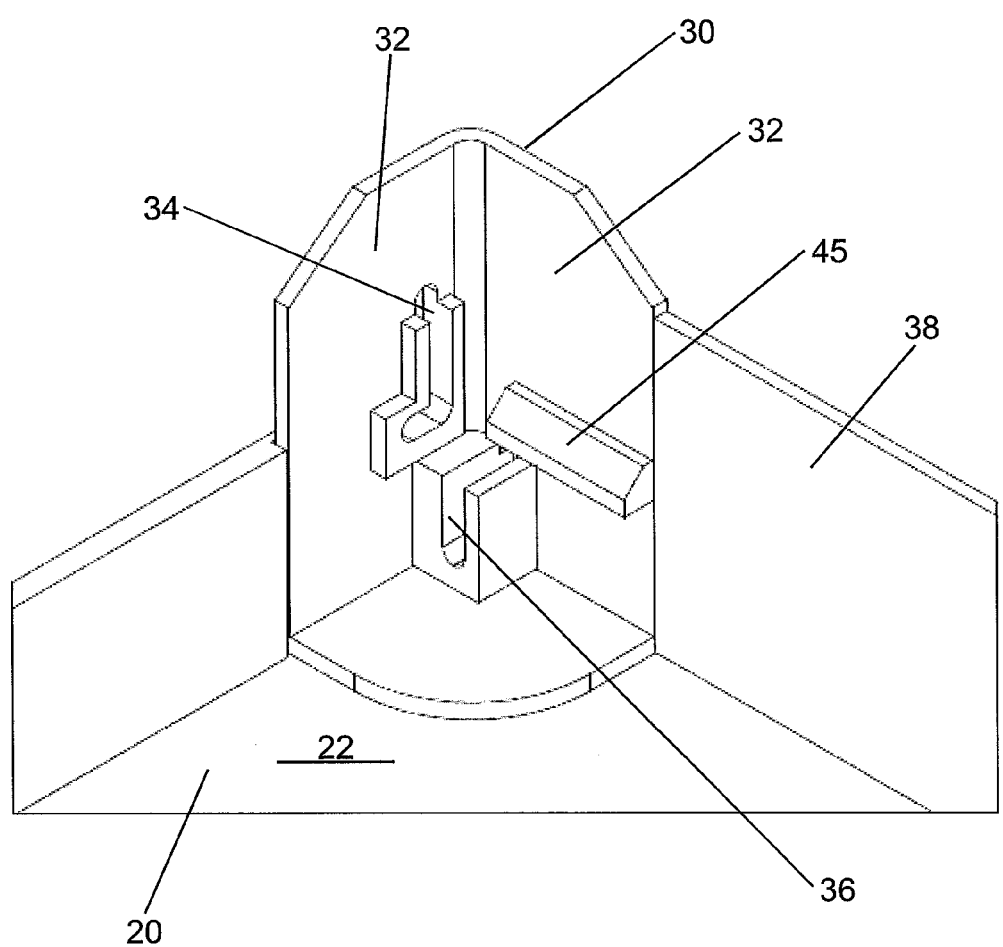
FIG. 8 is a perspective cutaway view of the inside of a corner portion of the base of the container as described herein.

FIGS. 5A-5E demonstrate the collapsibility of the container 10 for its commercial use. In use, the container 10 is loaded with product and shipped to its destination. At the destination, the container is collapsed so that it takes up less space where it is then transported for washing and sanitation, if necessary, and then further use. As demonstrated in FIG. 5A, the container 10 is shown with all four walls, 50 and 80 up and latched. In FIG. 5B, one of the end walls 80a is shown in its rotated down position. In FIG. 5C, the second end wall 80b is rotated down and lays on top of the first end wall 80a. These walls lay flat, because the hinge is allowed to move up and down in the slots 36 in the corner portions 30. In this way, the second end wall 80b lays flat on top of the first end wall 80a. In FIG. 5D, a sidewall 50a is rotated down. In FIG. 5E, the second sidewall 50b is rotated down so that the container 10 is now in its fully collapsed position for ready transportation. Depending on the relative positions of the corner portion slots 34 and 36, the end walls 80 may be folded down first if assuming that those corner portion slots 36 are under or lower than the corner portion slots 34 for the sidewalls 50.

In another feature not shown, similar containers 10 may be stacked upon each other with the sidewalls 50 and end walls 80 protected by the corner portions 30 that interlock with the respective adjacent containers that are stacked thereon.

Figures 9A, 9B:
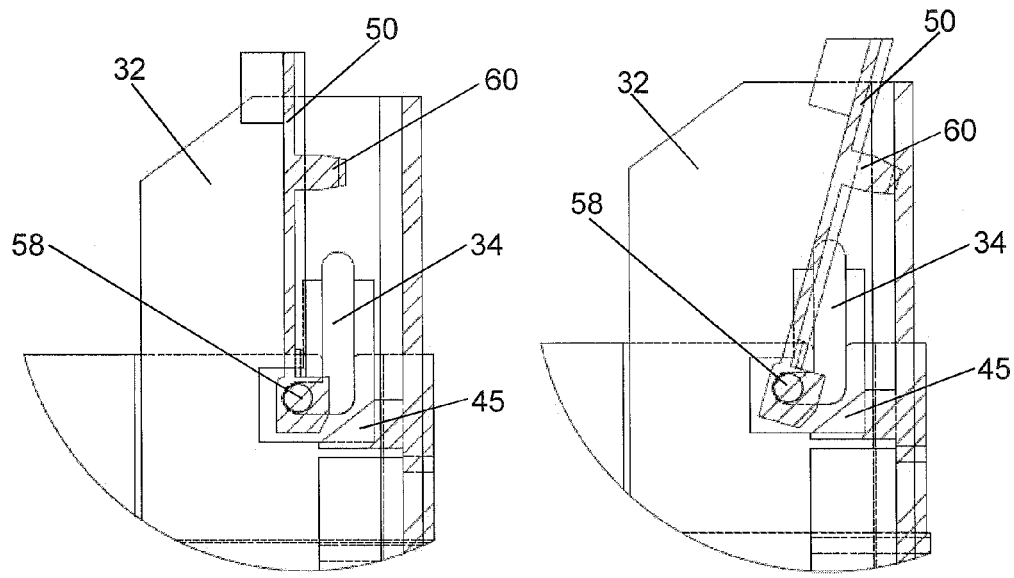
FIGS. 9A-9D are a series of drawings showing the action of the hinge pins in the slots in the corners of the base of the container as shown herein.
Figures 9C, 9D:
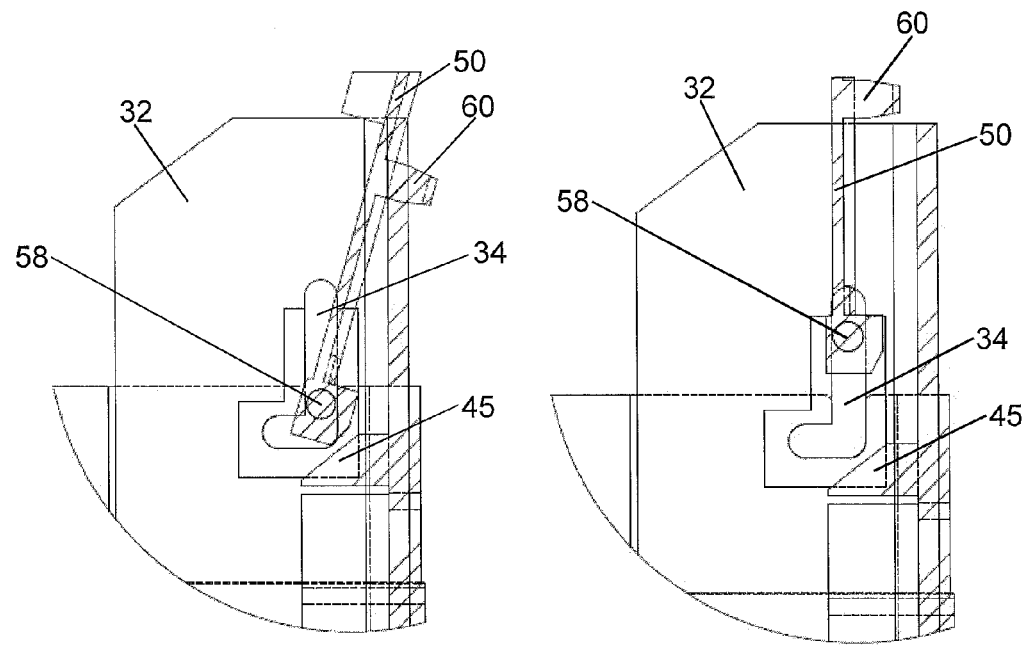
Figure 10:
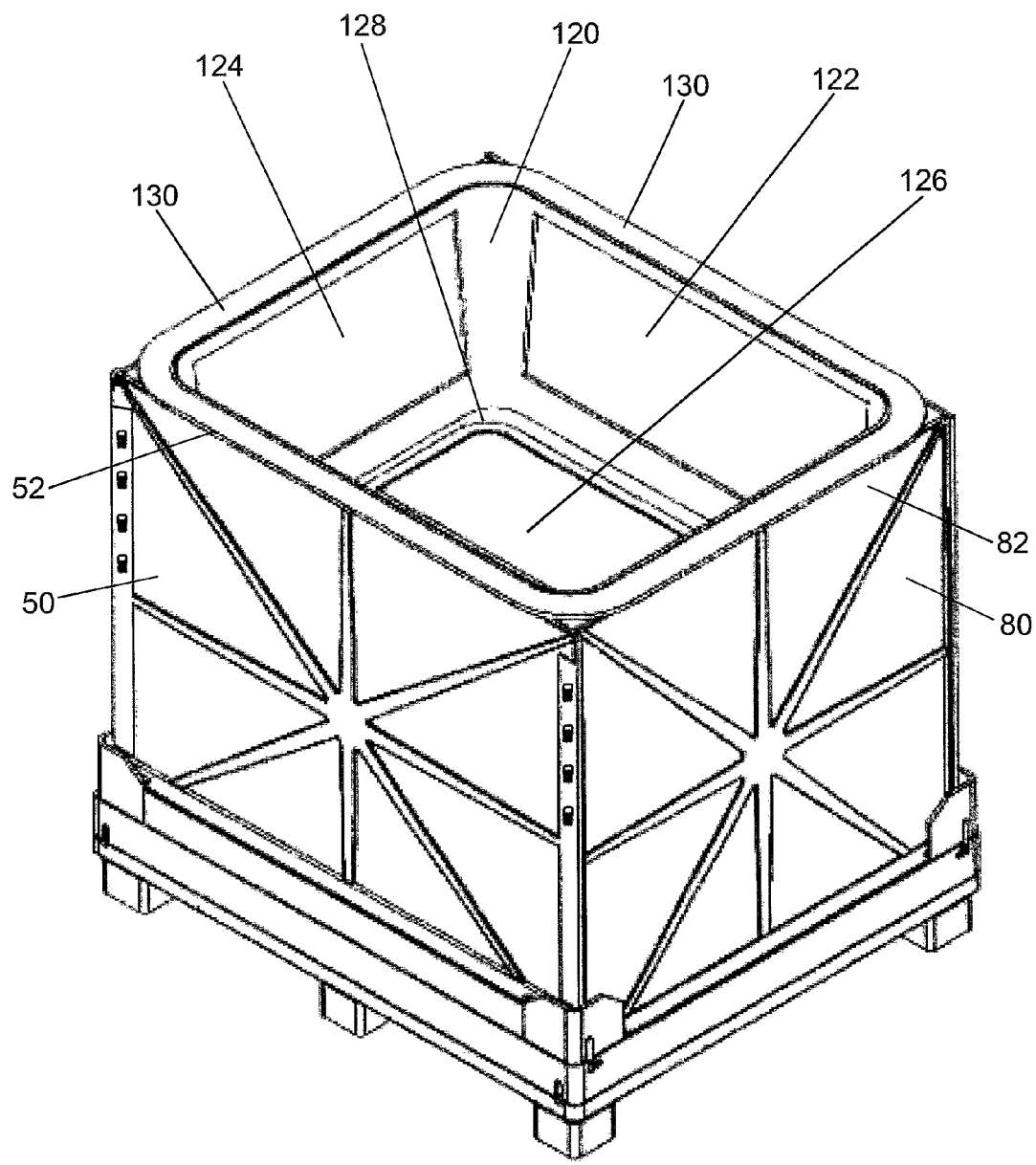
FIG. 10 is a perspective view of the container further having a damage reduction insert therein.
Figure 11:
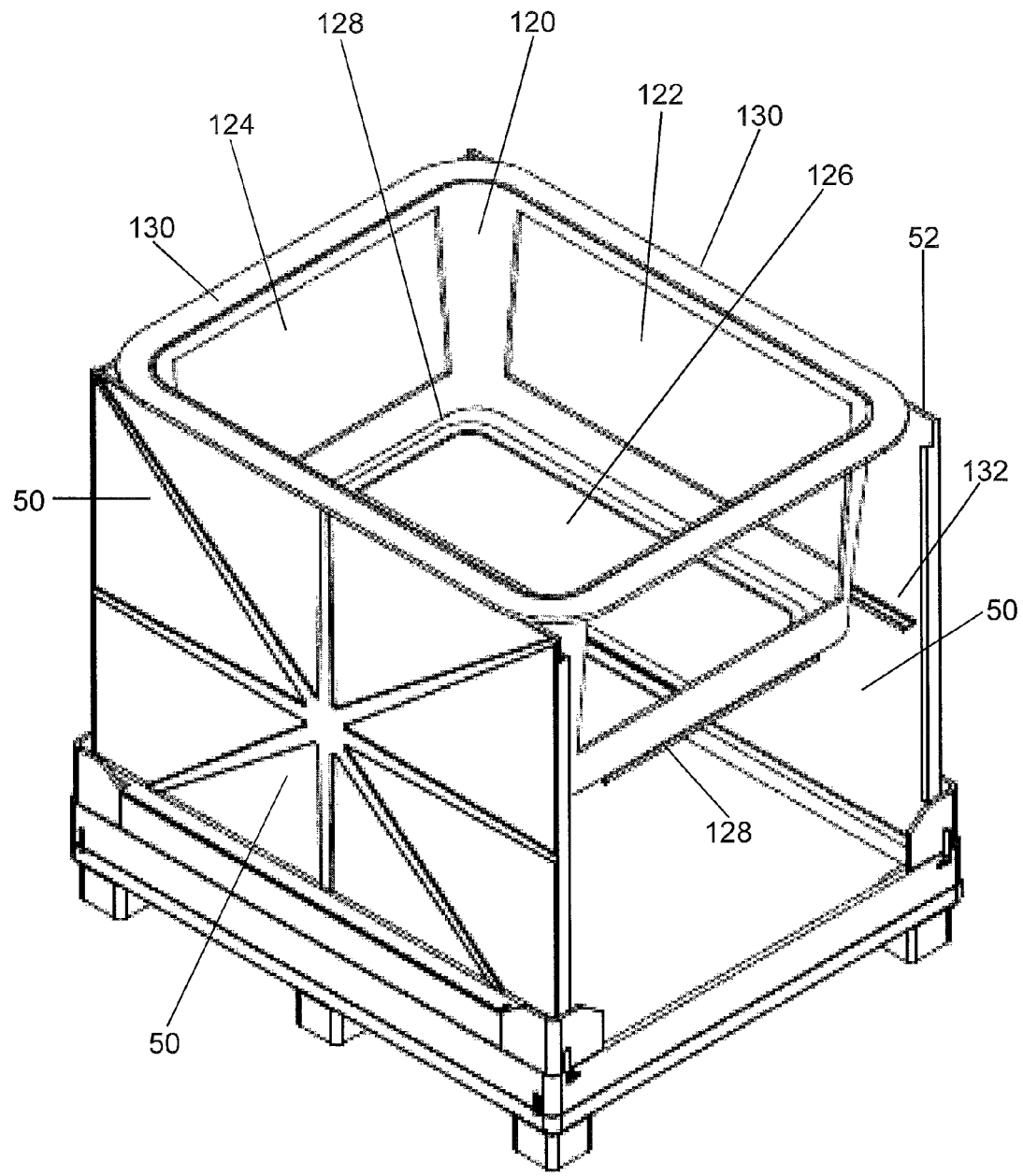
FIG. 11 is a perspective view of the container shown in FIG. 10 with an end wall removed.
Figure 12A:
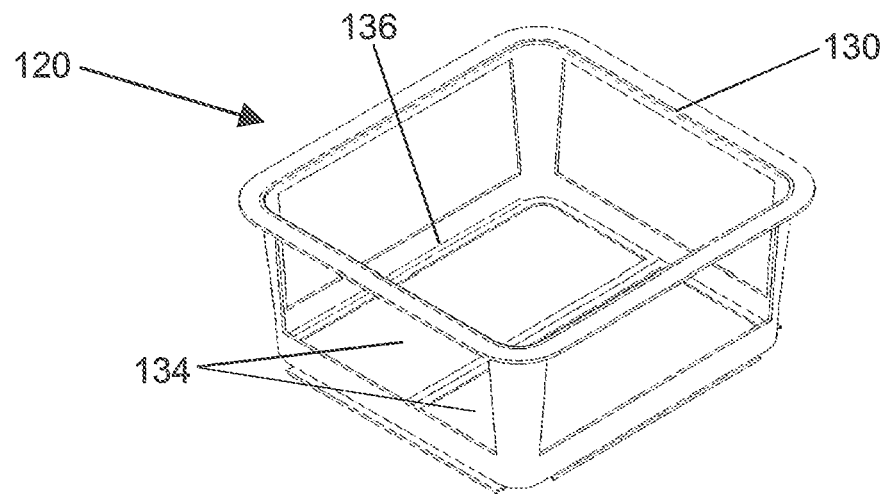
FIGS. 12A-12C demonstrate the operation of the doors in the base of the damage reduction insert.
Figure 12B:
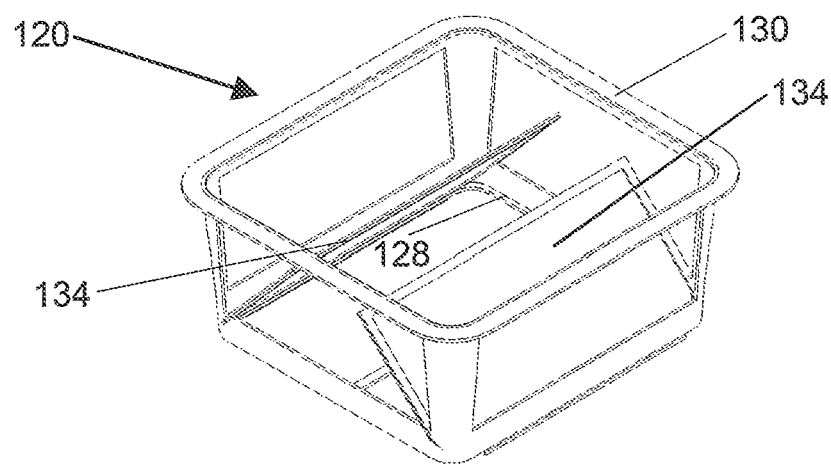
Figure 12C:
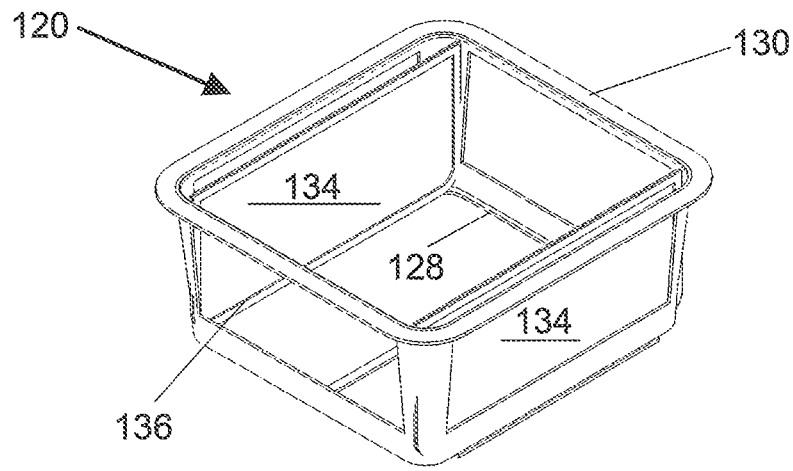

FIGS. 9A-9D demonstrate the up and down motion of a sidewall 50 during the latching mechanism. Also demonstrated is the wall locking guide 45 which ensures that the hinge pin 58 on the sidewall 50 is moved to the lower horizontal section of the corner portion slot 34. As shown in FIG. 9A, the hinge pin 58 is in this lower portion of the corner portion slot 34 and prevents the sidewall 50 from moving up and down in the longer portion of the slot 34 while the container is being handled. As shown in FIG. 9A, when the sidewall 50 is in the vertical, perpendicular upright position with respect to the container 10, then the hinge pin 58 is not allowed to move outwardly or it will frictionally engage the locking guide 45. However, in FIG. 9B, when the sidewall 50 is rotated outwardly, then the hinge pin 58 is able to slide toward the outside and not bump into the locking guide 45. As shown in FIG. 9C, the hinge pin 58 in the sidewall 50 can then move upwardly along the vertical portion of the slot 34. As demonstrated finally in FIG. 9D, the sidewall 50 is allowed to then move freely up and down within the slot 34.

Turning now to FIGS. 10-12C, there is shown a damage reduction insert 120. This insert 120 is designed to protect product that is placed inside the container 10 that might otherwise be crushed or otherwise damaged by stacking too much of the product on it. For instance, meat products that are first placed into the container 10 may be crushed or damaged by the hundreds of pounds of meat product that is stacked on top of it.

The damage reduction insert 120 includes sidewalls 122, end walls 124 and a base 126. The sidewalls 122 and end walls 124 have a height less than the height of the sidewalls 50 and end walls 80 of the container 10. The rectangular box shape of the insert 120 is sized to fit inside the container 10. One or more inserts 120 may be mounted within a container 10. In this example described herein, there is shown only one insert 120. If there were more than one insert, then a stacking or other support construction would be employed, not a nesting design.

The insert 120 has an outwardly-flaring flange 130 on the top side of the insert sidewalls 122 and end walls 124. This flange 130 engages the top sides 52 and 82 of the sidewalls 50 and end walls 80 respectively. Accordingly, the weight of the products placed inside the insert 120 is supported by the container sidewalls 50 and end walls 80.

Alternatively, there may also be a support ridge 132 along the inside walls of the container 10 that alternatively or additionally support the base 126 of the insert 120. Specifically, the base 126 includes a base perimeter edge 128. This edge 128 would rest on the support ridge along the inside walls of the container. The insert 120 also includes base doors 134 that make up a part of the base 126. The base doors 134 are connected by live hinges 136 to the base perimeter edge 128. In this way, the doors 134 may rotate upwardly only but not downwardly below the insert 120. In use, when the entire container 10 including insert 120 is rotated upwardly to an upside down position for dumping the contents, those contents will push the doors 134 of the insert 120 upwardly and open so that the food or product underneath the insert 120 can be easily dumped out by an industrial lift and dumping mechanism. There is shown two doors 134 in the Figures. Alternatively, there could be a single door that forms the base 126.

The composition of the base 20, sidewalls 50 and end walls 80 is preferably solid with no hollow portions or sections. These container 10 components may be formed from metal, composite, or plastic materials or combinations thereof. In one example of the present container 10, the container components are formed from a polyurethane/fiber composite that is both solid and strong. Importantly, the polyurethane material is also relatively lightweight. Also favorably, the polyurethane material is impermeable. In one example, a long fiber technology is used to create a polyurethane and fiberglass composite using a reaction injection molding process. The polyurethane polymer is light and durable, and the integral fiberglass fibers impart substantial reinforcement strength to the molded parts.

The hinge pins 58 and 88 disclosed herein are traditionally metal rods molded into the sidewalls 50 and end walls 80 respectfully. Alternatively, the hinge pins 58 and 88 may also be made of the plastic composition and are a part of the molded product itself. Either way, the hinge pin is formed with the respective walls so that they are integral and have no crevices around their base where they extend into or out from those walls.

The latches including the latch pins 66 or latch hooks 94 are similarly either molded in place in the sidewalls 50 and end walls 80, or they are plastic and part of the mold itself.

Still further, all or a part of the components of the container 10 may be over molded or otherwise coated for surface protection. This surface protection provides for UV protection, scratch protection, an antibacterial barrier and extra sealant. The type and amount of over mold or coating is determined based on the use of the container.

As noted, the urethane material in the present example is especially favorable for its weight and strength characteristics. These containers are shipped multiple times. The less weight that is shipped, the less cost that is associated with the container.

The container 10 is adapted to be cleaned for reuse. A concern is bacterial or other biological hazards or foreign materials remaining on or in the container 10 or in a container's nooks and crannies. Accordingly, the present container 10 is molded and engineered so that no crevices exist in the surface of any of the base or wall components. A crevice is defined herein as meaning a surface that has a greater than 90° angle between adjacent sections or portions of a surface. To the extent of the topography of the surface of each component, there are no right angle corners. In each case, the component is molded so that those adjacent walls are rounded off. There are no sharp corners where microbial pathogens can hide from a cleaning process. Even where the walls are molded with hinge pins or latches, the place where they are molded together is rounded so that the adjacent surfaces are not sharp angles. Furthermore, when assembled, the container 10 having hinge pin slots 34 and 36 that are open apertures through the face of those corner portions 30 means that any spray cleaning process has access for direct spray around the hinge connection points.

The feet 26 of the base 20, when attached to the bottom surface 24 of the base are brought tight enough so that a seal is created. The material that forms the feet 26 is soft or flexible enough to make the seal between the foot 26 and the base 20 a tight seal. There are no crevices formed.

The design or molded patterns 70 and 98 may be molded texture for support or structural purposes. Alternatively, these molded patterns 70 and 98 may have a primarily distinctive ornamental design purpose. This design and the uneven contour of the outer surface of the walls is not more than one half or 50% of the thickness of the overall wall, or alternatively not more than 25% of the thickness of the overall wall. Again, the contoured surface of the components is engineered so that there are no crevices, that is no adjacent surfaces of 90° or greater at their connection points.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A reusable, sanitary and folding container comprising:
    a base, two folding sidewalls, two folding end walls and end wall latches and hinges;
    wherein the base comprises a rectangular platform having four corner portions fixed at each of the four corners of the base platform respectively, with each corner portion in the shape of a raised, two-wall, V-shape that defines the corner of the platform; and further wherein each of the corner walls of the V-shape corner portion comprises a vertical slot that is an open slot through the thickness of the corner wall;
    wherein the two folding sidewalls are rectangular surfaces, each sidewall comprising two hinge pins that extend outwardly from two corners along a bottom side of each rectangular sidewall, the hinge pins being received in two of the vertical slots of adjacent corner portions so that the bottom sides of the sidewalls are hingedly connected to the base; and wherein the sidewalls are mounted on opposite sides of the base; and further wherein each sidewall comprises a C-shaped channel attached to opposite side edges that are each perpendicular to the bottom sides of the sidewalls; the C-shaped channel comprising a latch pin fixed across the channel and proximate a top side of the sidewalls and the end of the C-shaped channel opposite the bottom side of the sidewalls;

wherein the two folding end walls are rectangular surfaces, each end wall comprising two hinge pins that extend outwardly from two corners along a bottom side of each rectangular end wall, the hinge pins being received in two of the vertical slots of adjacent corner portions so that the bottom sides of the end walls are hingedly connected to the base; and wherein the end walls are mounted on opposite sides of the base; and further wherein each end wall latch extends outwardly from the end wall on opposite side edges perpendicular to the bottom sides of the end walls; the latch comprising a slot for engaging the latch pin of an adjacent sidewall when the sidewall and end wall are rotated in the up position substantially normal to the plane of the bottom of the box, wherein the sidewall and end wall hinge pins are the only connection of the sidewalls and end walls respectively to the base;

wherein the sidewalls and end walls not including their hinge pins are each monolithic and contain no hollow portions therein;

further wherein there are no crevices in the topography of the surface of the sidewalls and end walls, whereby the sidewalls and end walls may be efficiently cleaned between uses;

and further wherein one of the vertical slots in each corner portion has a lower horizontal section connected to the vertical slot to receive the respective sidewall hinge pin, and when the sidewall is in its generally perpendicular position with respect to the base, the hinge pin is moved to the lower horizontal section which prevents the sidewall from moving up and down in the vertical length of the vertical slot.

2. A reusable, sanitary and folding container as described in claim 1,
wherein the latch on each side of each end wall comprises a flange having a latch groove therein adapted to receive and engage the latch pin of the adjacent sidewall.

3. A reusable, sanitary and folding container as described in claim 1, wherein the base, two folding sidewalls and two folding end walls are comprised of plastic.

4. A reusable, sanitary and folding container as described in claim 3, wherein the plastic comprises a polyurethane and fiberglass composite.

5. A reusable, sanitary and folding container as described in claim 1, wherein the latch comprises an L-shaped finger adapted to hook over and engage the latch pin of the adjacent sidewall.

6. A reusable, sanitary and folding container as described in claim 1, wherein the base comprises a plurality of feet attached thereto on the opposite side of the platform from the corner portions; and wherein the feet are substantially monolithic and include essentially no exposed crevices therein.

7. A reusable, sanitary and folding container as described in claim 6, wherein the feet are comprised of polyurethane.

8. A reusable, sanitary and folding container as described in claim 1,
wherein the corner portions comprise a locking guide thereon on one of the walls of each of the corner portions; and
whereby either the sidewall or the end wall is prevented from moving up and down by the locking guide.

9. A reusable, sanitary and folding container as described in claim 1,
further comprising a damage reduction insert, the insert comprising a rectangular box sized to fit inside the container, wherein the box comprises a base, two sidewalls and two end walls and the box sidewalls and end walls have a height that is less than the height of the container sidewalls and end walls;
and the box further comprises a box flange on the top side of the box sidewalls and end walls and opposite the box base;
wherein the box flange is flared outwardly and is adapted to engage the top of the container sidewalls and end walls so that the box base is secured inside the container and above the container base.

10. A reusable, sanitary and folding container as described in claim 9, wherein the box base comprises a door that is retained on the box base edge but that is hingedly connected to the box base so that the door rotates upwardly when the box base is inverted to an upside down position.

11. A reusable, sanitary and folding container as described in claim 1, wherein the base, sidewalls and end walls are each monolithic and contain no hollow portions therein.

12. A reusable, sanitary and folding container as described in claim 11, wherein the surfaces that comprise the base, sidewalls and end walls are substantially flat and define no crevices, whereby the container is able to be reliably washed for reuse and there are no crevices to harbor pathogens.

13. A reusable, sanitary and folding container as described in claim 12, wherein the topography of the base, sidewalls and end walls comprise no texture more than about one-half of the thickness of the respective base, sidewall or end wall having an uneven surface.

14. A reusable, sanitary and folding container comprising:
a base, two folding sidewalls, two folding end walls and end wall latches and hinges;
wherein the base comprises a rectangular platform having four corner portions fixed at each of the four corners of the base platform respectively, with each corner portion in the shape of a raised, two-wall, V-shape that defines the corner of the platform; and further wherein each of the corner walls of the V-shape corner portion comprises a vertical slot that is an open slot through the thickness of the corner wall;
wherein the two folding sidewalls are rectangular surfaces, each sidewall comprising two hinge pins that extend outwardly from two corners along a bottom side of each rectangular sidewall, the hinge pins being received in two of the vertical slots of adjacent corner portions so that the bottom sides of the sidewalls are hingedly connected to the base; and wherein the sidewalls are mounted on opposite sides of the base; and further wherein each sidewall comprises a C-shaped channel attached to opposite side edges that are each perpendicular to the bottom sides of the sidewalls; the C-shaped channel comprising an aperture in the channel that is perpendicular to the sidewall and proximate a top side of the sidewalls and the end of the C-shaped channel opposite the bottom side of the sidewalls;
wherein the two folding end walls are rectangular surfaces, each end wall comprising two hinge pins that extend outwardly from two corners along a bottom side of each rectangular end wall, the hinge pins being received in two of the vertical slots of adjacent corner portions so that the bottom sides of the end walls are hingedly connected to the base; and wherein the end walls are mounted on opposite sides of the base; and further wherein each end wall latch extends outwardly from the end wall on opposite side edges perpendicular to the bottom sides of the end walls; the latch adapted to engage the aperture in the channel of an adjacent sidewall when the sidewall and end wall are rotated in the up position substantially normal to the plane of the bottom of the box, wherein the sidewall and end wall hinge pins are the only connection of the sidewalls and end walls respectively to the base;

wherein the sidewalls and end walls not including their hinge pins are each monolithic and contain no hollow portions therein;

further wherein there are no crevices in the topography of the surface of the sidewalls and end walls, whereby the sidewalls and end walls may be efficiently cleaned between uses;

and further wherein one of the vertical slots in each corner portion has a lower horizontal section connected to the vertical slot to receive the respective sidewall hinge pin, and when the sidewall is in its generally perpendicular position with respect to the base, the hinge pin is moved to the lower horizontal section which prevents the sidewall from moving up and down in the vertical length of the vertical slot.

15. A reusable, sanitary and folding container as described in claim 14, wherein the end wall latches comprise a clip that frictionally engages the sidewall aperture.

* * * * *